United States Patent
Nagaoka

(10) Patent No.: US 10,392,984 B2
(45) Date of Patent: Aug. 27, 2019

(54) NOX REDUCTION CONTROL METHOD FOR EXHAUST GAS AFTERTREATMENT DEVICE

(71) Applicant: ISUZU MOTORS LIMITED, Tokyo (JP)

(72) Inventor: Daiji Nagaoka, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/327,356

(22) PCT Filed: Jul. 13, 2015

(86) PCT No.: PCT/JP2015/070039
§ 371 (c)(1),
(2) Date: Jan. 18, 2017

(87) PCT Pub. No.: WO2016/009992
PCT Pub. Date: Jan. 21, 2016

(65) Prior Publication Data
US 2017/0167343 A1    Jun. 15, 2017

(30) Foreign Application Priority Data

Jul. 18, 2014   (JP) .................................. 2014-147816

(51) Int. Cl.
*F01N 3/08*   (2006.01)
*F01N 3/10*   (2006.01)
(Continued)

(52) U.S. Cl.
CPC ........... *F01N 3/2033* (2013.01); *F01N 3/021* (2013.01); *F01N 3/08* (2013.01); *F01N 3/0814* (2013.01);
(Continued)

(58) Field of Classification Search
CPC .... F01N 3/2033; F01N 3/0842; F01N 3/0814; F01N 3/106; F01N 11/002; F01N 3/021; F01N 2550/03
See application file for complete search history.

(56) References Cited

U.S. PATENT DOCUMENTS

2008/0236144 A1   10/2008 Nakata et al.
2009/0019836 A1*  1/2009 Nagaoka ............... F01N 3/0253
                                                     60/285
(Continued)

FOREIGN PATENT DOCUMENTS

CN     102016252 A    4/2011
EP       2261489 A1   12/2010
(Continued)

OTHER PUBLICATIONS

International Search Report and Written Opinion for PCT App No. PCT/JP2015/070039, dated Oct. 13, 2015, 17 pgs.
(Continued)

*Primary Examiner* — Daniel C. Mccracken
(74) *Attorney, Agent, or Firm* — Procopio, Cory, Hargreaves & Savitch LLP

(57) ABSTRACT

This NOx reduction control method is for an exhaust gas aftertreatment device having an oxidation catalyst and an LNT catalyst which are disposed in an exhaust pipe and repeating an adsorption or occlusion of NOx which is executed when an air-fuel ratio is in a lean state and a reduction of NOx which is executed when the air-fuel ratio is in a rich state, the method including executing a post-injection or an exhaust pipe injection and causing HC to be adsorbed in the oxidation catalyst when an exhaust gas temperature is low, and causing the HC which is adsorbed in the oxidation catalyst to be desorbed and reducing an
(Continued)

adsorbed NOx in the LNT catalyst by raising the exhaust gas temperature during the rich state.

4 Claims, 2 Drawing Sheets

(51) Int. Cl.
    *F01N 3/20*     (2006.01)
    *F01N 11/00*     (2006.01)
    *F01N 3/021*     (2006.01)

(52) U.S. Cl.
    CPC ......... *F01N 3/0842* (2013.01); *F01N 3/0871* (2013.01); *F01N 3/103* (2013.01); *F01N 3/106* (2013.01); *F01N 3/204* (2013.01); *F01N 3/2006* (2013.01); *F01N 11/002* (2013.01); *F01N 2430/06* (2013.01); *F01N 2430/085* (2013.01); *F01N 2550/03* (2013.01); *F01N 2560/026* (2013.01); *F01N 2560/06* (2013.01); *F01N 2560/14* (2013.01); *F01N 2610/03* (2013.01); *F01N 2900/1404* (2013.01); *F01N 2900/1614* (2013.01); *Y02T 10/24* (2013.01); *Y02T 10/26* (2013.01); *Y02T 10/47* (2013.01)

(56) References Cited

U.S. PATENT DOCUMENTS

| | | | |
|---|---|---|---|
| 2009/0056314 A1* | 3/2009 | Gabe ................ | B01D 53/9409 60/278 |
| 2009/0120069 A1* | 5/2009 | Nagaoka ............ | B01D 53/9495 60/286 |
| 2011/0041479 A1 | 2/2011 | Nagaoka et al. | |

FOREIGN PATENT DOCUMENTS

| | | |
|---|---|---|
| EP | 2559872 A1 | 2/2013 |
| JP | 2001-050034 A | 2/2001 |
| JP | 2006-336589 A | 12/2006 |
| JP | 2008-240704 A | 10/2008 |
| JP | 2009-002179 A | 1/2009 |
| JP | 2009-007944 A | 1/2009 |
| JP | 2011-208600 A | 10/2011 |
| JP | 2012-026289 A | 2/2012 |
| JP | 2013-124643 A | 6/2013 |

OTHER PUBLICATIONS

Extended European Search Report for EP App No. 15821434.6 dated Apr. 9, 2018, 23 pgs.
First Office Action for related CN App No. 201580038103.X dated Jul. 4, 2018, 14 pgs.

* cited by examiner

NOX REDUCTION CONTROL METHOD FOR EXHAUST GAS AFTERTREATMENT DEVICE

CROSS-REFERENCE TO RELATED APPLICATIONS

This application is a U.S. National Stage entry of PCT Application No. PCT/JP2015/070039, filed on Jul. 13, 2015, which claims priority to JP Application No. 2014-147816, filed Jul. 18, 2014. The contents of the foregoing are incorporated by reference.

TECHNICAL FIELD

The present invention relates to an exhaust gas aftertreatment device which utilizes an NOx occlusion reduction catalyst and more particularly to an NOx reduction control method for an exhaust gas aftertreatment device in which hydrocarbons (HC) are adsorbed to an oxidation catalyst or the like of the exhaust gas aftertreatment device for use for NOx reduction.

BACKGROUND ART

DOC (Diesel Oxidation Catalyst), DPF (Diesel Particulate Filter) and NOx occlusion reduction catalyst (LNT: Lean NOx Trap or NSR: NOx Storage Reduction) systems have already been put into practice as exhaust gas aftertreatment devices for diesel engines.

An NOx occlusion reduction catalyst is such that a noble metal catalyst such as Pt, Pd or the like and an occlusion material having an NOx occlusion function such as an alkali metal including Na, K, Cs and the like, an alkali earth metal including Ca, Ba and the like or a rare earth including Y, La, Ce and the like are carried on a catalyst carrier such as an alumina ($Al_2O_3$) and exhibits two functions to occlude NOx and to release and purify NOx depending on the oxygen concentration in exhaust gases.

With a purification system utilizing the NOx occlusion reduction catalyst (hereinafter, referred to as an LNT catalyst) which reduces NOx by using the three-way catalyst function, under a condition in which the oxygen concentration in exhaust gases is high (a lean air-fuel ratio) as in a normal operating state, NO in exhaust gases is oxidized to $NO_2$ by a noble metal catalyst such as Pt or Pd, and the occlusion material occludes the oxidated substances as nitrates ($Ba(NO_3)_2$) to purify NOx.

When the occlusion of NOx continues, however, since nitrates are saturated to lose the occlusion function as the occlusion material, the operating condition is changed to form a rich state by performing an EGR (Exhaust Gas Recirculation), a post-injection of fuel or an exhaust pipe injection of fuel under a low oxygen concentration condition (a rich air-fuel ratio), so that fuel is reduced on the noble metal catalyst to thereby produce CO, HC, $H_2$ in the exhaust gases so as to reduce released NOx for purification.

In this way, in the purification system using the LNT catalyst, the three-way catalyst function works in which NOx is adsorbed or occluded when the air-fuel ratio is in a lean state (under the high oxygen concentration condition), and the NOx adsorbed or occluded are disorbed or released from Ce or Ba during the rich state, so that HC, CO and NOx in the exhaust gases become harmless by the three-way catalyst function.

PRIOR ART LITERATURE

Patent Literature

Patent Literature 1: JP-A-2009-002179
Patent Literature 2: JP-A-2001-050034
Patent Literature 3: JP-A-2008-240704

SUMMARY OF THE INVENTION

Problem that the Invention is to Solve

At this time, with regard to released NOx, in case the amounts of HC and CO which are necessary for the required reaction are not enough, part of NOx is not reduced, and the untreated. NOx is released as it is.

Normally, HC are dosed to exhaust gases as a result of performing a post-injection in the cylinders or dosing HC into the exhaust pipe and are dissociated by temperatures or a catalyst reaction in the DOC to be supplied to the catalyst.

However, when the temperatures of the exhaust gas and the catalyst are low (equal to or lower than 200° C.), since it takes some time until supplied unburnt fuel is dissociated into HC, the NOx reduction efficiency is reduced during the rich state and NOx tends to slip easily.

When the temperature becomes high to some extent (for example, 250° C. or higher), HC are dissociated at higher speeds so as to more easily contribute to the reduction of NOx, whereby the NOx slip is reduced during the rich state.

The switching between the lean and rich operations is performed as follows. An NOx adsorption amount is estimated based on a detection value of an NOx sensor provided at the inlet and exit of the LNT catalyst. Alternatively, an NOx adsorption amount is estimated by obtaining an NOx amount based on a map from an NOx concentration which is based on an operating state of the engine, that is, the amount of injection of fuel and an exhaust gas flow rate, and integrating the obtained NOx amount according to the operating state. Then, when the NOx adsorption amount exceeds a set value, the operating state is switched from the lean operating state to the rich operating state, and when the NOx reduction amount becomes equal to or smaller than a threshold value, the operating state is switched from the rich operating state to the lean operating state.

However, as described above, when the temperature of the exhaust gas is equal to or lower than 200° C. which is the catalyst activation temperature, there is caused a problem that even when the operating state is switched from the lean operating state to the rich operating state, the NOx reduction cannot be effected sufficiently.

Accordingly, an object of the present invention is to solve the problem described above and to provide an NOx reduction control method for an exhaust gas aftertreatment device which can execute an NOx reduction without any problem even when the temperature of the exhaust gas is low.

Means for Solving the Problem

With a view to achieving the object, according to the present invention, there is provided an NOx reduction control method for an exhaust gas aftertreatment device having an oxidation catalyst and an LNT catalyst which are disposed in an exhaust pipe and repeating an adsorption or occlusion of NOx which is executed when an air-fuel ratio is in a lean state and a reduction of NOx which is executed when the air-fuel ratio is in a rich state, the method including executing a post-injection or an exhaust pipe injection and causing HC to be adsorbed in the oxidation catalyst when an exhaust gas temperature is low and causing the HC which is adsorbed in the oxidation catalyst to be desorbed and reducing an adsorbed NOx in the LNT catalyst by raising the exhaust gas temperature during the rich state.

MODE FOR CARRYING OUT THE INVENTION

Hereinafter, a preferred embodiment of the present invention be described in detail based on the accompanying drawings.

Figure 1:
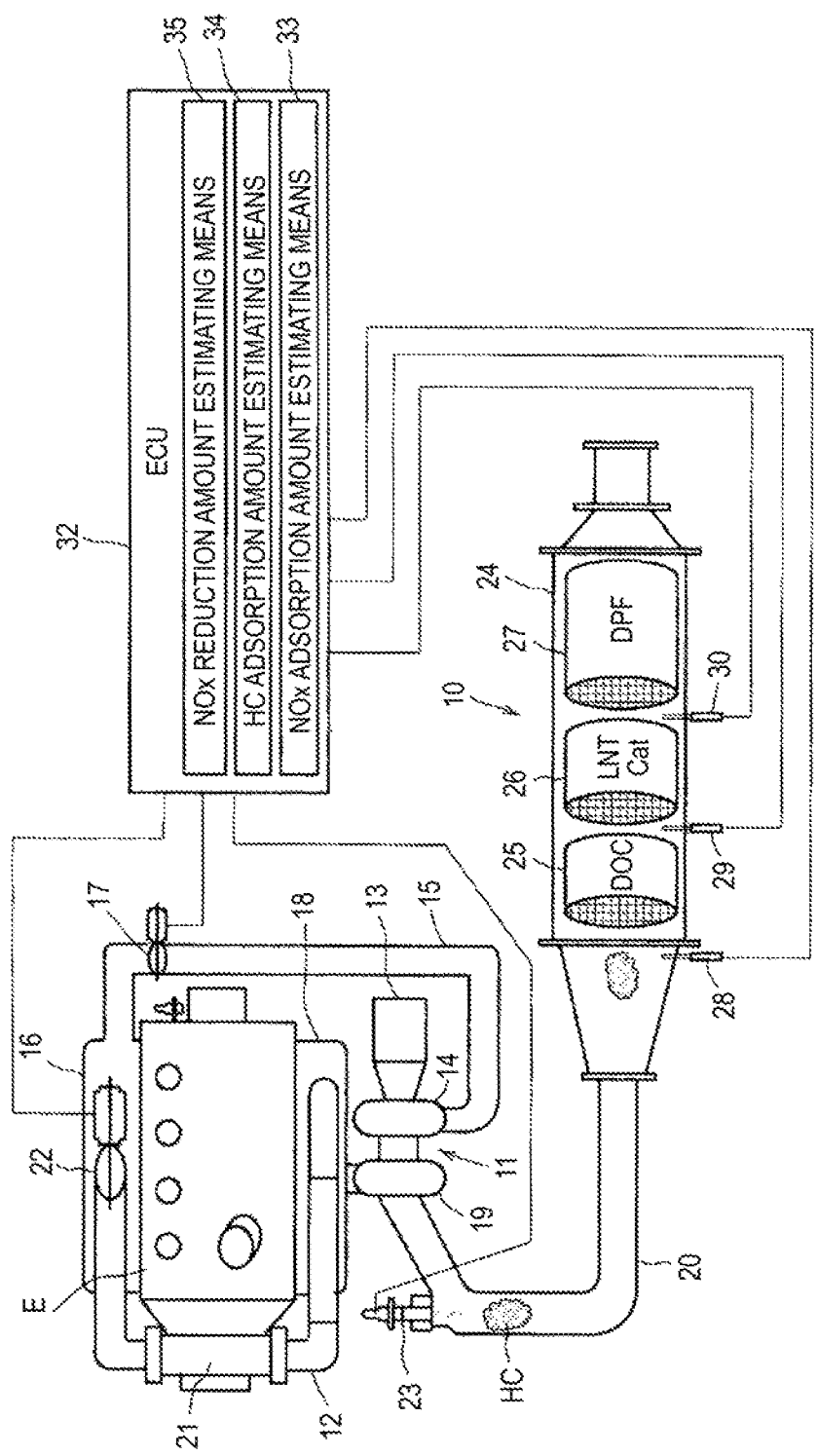
FIG. 1 is a schematic diagram showing a device for executing an NOx reduction control method for an exhaust gas aftertreatment device of the present invention.

FIG. 1 shows an exhaust gas aftertreatment device 10 which utilizes an LNT catalyst.

A turbocharger 11 and an EGR pipe 12 are connected to an intake and exhaust systems of an engine E, whereby air which is taken in from an air cleaner 13 is compressed by a compressor 14 of the turbocharger 11 and is then sent under pressure to an intake passageway 15 so as to be supplied into the engine E from an intake manifold 16 of the engine E. An intake valve 17 which controls the amount of air supplied to the engine E is provided along the intake passageway 15.

Exhaust gas discharged from the engine E is discharged from an exhaust manifold 18 to a turbine 19 of the turbocharger 11 to drive the turbine 19 and is then discharged into an exhaust pipe 20.

The EGR pipe 12 is connected to the intake manifold 16 and the exhaust manifold 18, and both an EGR cooler 21 for cooling exhaust gases which flows from the exhaust manifold 18 to the intake manifold 16 and an EGR valve 22 for controlling an EGR amount are connected to the EGR pipe 12.

In the exhaust gas aftertreatment device 10, an exhaust pipe injector 23 is provided downstream of the turbine 19 on the exhaust pipe 20, and a DOC (Diesel Oxidation Catalyst) 25, an LNT catalyst 26 and a DFP 27 are canned sequentially in a canning container 24 which is formed downstream of the exhaust pipe injector 23 on the exhaust pipe 20.

A pre-DOC exhaust gas temperature sensor 28 is provided upstream of the DOC 25, and a post-DOC exhaust gas temperature sensor 29 and an NOx sensor 30 are provided on an entrance side and an exit side of the LNT catalyst 26, respectively.

An overall operation of the engine E is controlled by an ECU 32. The ECU 32 includes an NOx adsorption amount estimating means 33, an adsorption amount estimating means 34 and an NOx reduction amount estimating means 35.

The ECU 32 executes a lean cycle in which the LNT catalyst 26 is caused to occlude NOx with an air-fuel ratio staying in a lean state and a rich cycle in which, when an NOx occlusion rate is reduced, NOx are reduced for purification with the air-fuel ratio staying in a rich state by executing a post-injection in cylinders or injecting fuel HC in a pulsating fashion by using the exhaust pipe injector 23 shown.

In switching between the lean cycle and the rich cycle, the NOx adsorption amount estimating means 33 estimates an amount of NOx adsorbed by the LNT catalyst 26 during a lean combustion, and when the NOx adsorption amount reaches a set value, the lean combustion is switched to the rich combustion.

The NOx adsorption amount estimating means 33 obtains an amount of NOx which is released based on a map from an NOx concentration which is based on the operating state of the engine and an exhaust gas flow rate, and integrates the NOx amount so obtained to estimate an NOx adsorption amount at the LNT catalyst 26 or calculates an NOx adsorption amount based on a detection value of the NOx sensor 30.

The ECU 32 controls the combustion of the engine based on the lean cycle when the NOx adsorption amount is smaller than the set value and controls the combustion of the engine based on the rich cycle when the NOx adsorption amount is equal to or greater than the set value.

In the present invention, in the lean cycle, the ECU 32 executes the post-injection or activates the exhaust pipe injector 23 to inject fuel when an exhaust gas temperature detected by the pre-DOC exhaust gas temperature sensor 28 is lower than a catalyst activation temperature (approximately 200° C.).

By doing so, unburnt fuel is adsorbed by the DOC 25, during which the unburnt fuel is so adsorbed while being dissociated to HC in the DOC 25. This HC adsorption amount is calculated by the HC adsorption amount estimating means 34 based on a post-injection amount or an amount of fuel injected by the exhaust pipe injector 23.

In the rich cycle, the NOx reduction amount estimating means 35 calculates an NOx reduction amount when NOx are reduced by HC, and when the NOx reduction amount so calculated becomes equal to or smaller than a threshold value, the rich cycle is switched to the lean cycle.

In the normal rich cycle, when the exhaust gas temperature is low, since it takes some time until being dissociated into HC, the NOx reduction efficiency at the catalyst is reduced, and the slip of NOx tends to takes place easily.

In the present invention, when the exhaust temperature is low, fuel (HC) is supplied into the exhaust pipe 20 by means of a post-injection or an exhaust pipe injection to be adsorbed by the DOC 25. The HC which are adsorbed in advance by the DOC 25 are desorbed from the DOC 25 when the exhaust gas temperature exceeds 200° C. to be used easily for NOx reduction, and the reduction of NOx progresses even at low exhaust gas temperatures during the rich state, whereby the NOx slip can be reduced.

In this way, the reduction of NOx when the exhaust gas temperature is low during the rich state can be executed by making use of the HC which are adsorbed in advance by the catalyst, and therefore, the engine is allowed to devotedly increase the exhaust gas temperature and produce a rich air-fuel ratio, whereby an improvement in reduction efficiency by increasing the temperature can be expected.

The DOC 25 and the LNT catalyst 26 act to adsorb NOx and HC when the exhaust gas temperature is so low as to be equal to or lower than 200° C. Accordingly, in a lean combustion, HC are supplied into exhaust gases when the exhaust gas temperature is low, and the HC so supplied are caused to be adsorbed mainly by the DOC 25, and part of the which is not adsorbed by the DOC 25 is caused to be adsorbed by the LNT catalyst 26.

In case the amount of adsorption of HC is too great, when the exhaust gas temperature is increased, there may be a case where the exhaust gas temperature is increased extraordinarily. Therefore, an HC adsorption amount is estimated by the HC adsorption amount estimating means 34, and a threshold value is provided for the ETC adsorption amount.

Then, when the TIC adsorption amount reaches the threshold value, the post-injection or the exhaust pipe injection is stopped to prevent an excessive adsorption.

A rich reduction is executed when the exhaust gas temperature exceeds the activation temperatures (for example, 200° C.) of the DOC 25 and the LNT catalyst 26. The rich reduction to be executed here is intended to increase the exhaust gas temperature by burning fuel supplied into the cylinders by means of a post-injection and to make the air-fuel ratio of exhaust gas rich. Namely, since the conventional supply of HC into the exhaust pipe is not intended, as to an injection timing, the post-injection is moved close to a main injection (for example, within 45° BTDC). A main injection amount and a post-injection amount are calibrated so as not to produce a sensation of physical disorder so that torque produced during the rich state matches torque produced when combustion is performed normally. As this occurs, a glow plug may be energized to assist the combustion.

When the exhaust gas whose temperature is increased reaches surfaces of the catalysts, the movement of molecules is activated, the HC adsorbed by the DOC 25 and the NOx adsorbed by the LNT catalyst 26 are desorbed therefrom, and the NOx are reduced under the rich air-fuel ratio.

When the rich combustion is performed several times, the temperatures of the catalysts are increased to a high temperature (250° C. or higher), and all the HC adsorbed by the DOC 25 are desorbed to be used for NOx reduction. Thus, when the amount of desorption of HC is reduced to a low level based on the HC adsorption amount estimated by the HC adsorption amount estimating means 34, the rich combustion method is changed, and the post-injection is delayed (for example, the crank angle is 150° BTDC) so as to supply FTC from the engine to the catalyst. Since the catalyst is heated to the high temperature, the dissociation of HC is promoted, whereby an NOx reduction can be executed even by HC supplied from the engine during the rich state.

Figure 2:
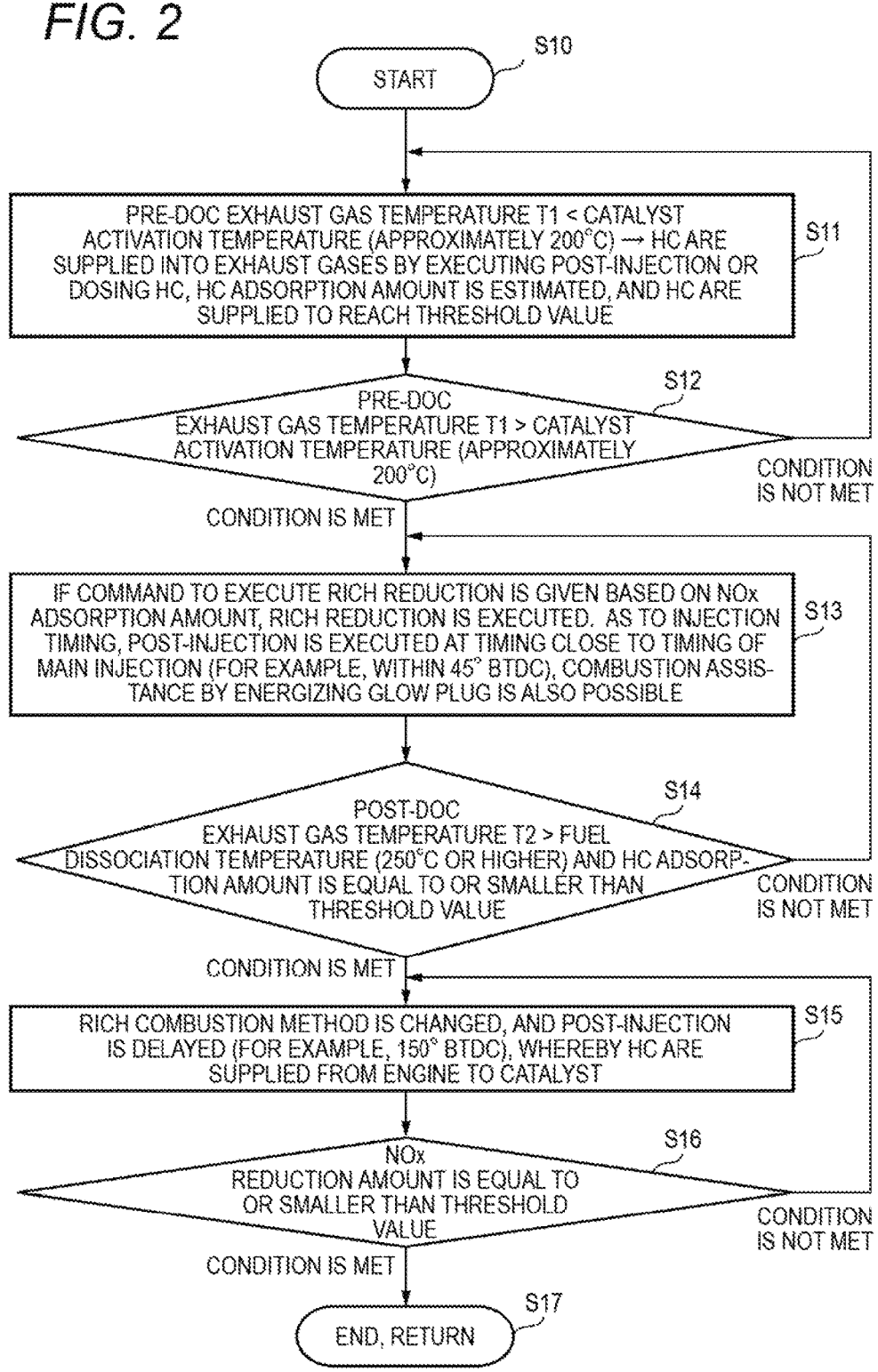
FIG. 2 is a flowchart showing the NOx reduction control method for an exhaust gas aftertreatment device of the present invention.

Next, the NOx reduction control method described heretofore will be explained based on a flowchart shown in FIG. 2.

When the control is started in step S10, in step S11, when the pre-DOC exhaust gas temperature T1≤the catalyst activation temperature (approximately of 200° C.), HC are supplied into exhaust gases by means of a post-injection or dosing HC into the exhaust pipe.

Next, in step S12, it is determined whether or not the pre-DOC exhaust gas temperature T1>the catalyst activation temperature (approximately of 200° C.). If it is determined that the pre-DOC exhaust gas temperature T1 is lower than the catalyst activation temperature (the condition is not met; NO), the control process is returned to step S11, where HC is continued to be supplied into exhaust gases while integrating the HC so supplied, and an amount of HC adsorbed by the catalyst is estimated. In these steps S11, S12, if the HC adsorption amount reaches the threshold value (the set value), the supply of HC is stopped.

If it is determined in step S12 that the pre-DOC exhaust gas temperature T1 exceeds the catalyst activation temperature (approximately of 200° C.) (the condition is met; '{ES}, the control process proceeds to step S13, where a rich reduction is executed if a command to execute such a rich reduction is given based on the NOx adsorption amount. In the execution of the rich reduction, as to the timing of injection of fuel, since fuel is injected not to supply HC into the exhaust pipe but to raise the exhaust gas temperature, the post-injection is executed at a timing which is close to the timing of a main injection (for example, within 45° BTDC), whereby fuel is injected almost as in an after-injection. In this case, the exhaust gas temperature may be raised by assisting the combustion by energizing the glow plug.

Next, it is determined in step S14 whether or not a post-DOC exhaust gas temperature T2>a fuel dissociation temperature (250° C. or higher), and if the post-DOC exhaust gas temperature T2 does not exceed the fuel dissociation temperature or the HC adsorption amount does not exceed the threshold value (the condition is not met), the control process is returned to step S13, where the post-injection is caused to continue to raise the exhaust gas temperature whereby NOx are reduced by using the adsorbed HC in step S13. On the other hand, if it is determined in step S14 that the post-DOC exhaust gas temperature T2 exceeds the fuel dissociation temperature and that the HC adsorption amount is equal to smaller than the threshold value (the condition is met), in step S15, the rich combustion method is changed, so that the post-injection is delayed (for example, the crank angle is 150° BTDC) to realize the normal post-injection so as to supply HC from the engine to the catalyst to thereby execute a rich reduction.

Next, it is determined in step S16 whether or not the NOx reduction amount becomes equal to or smaller than the threshold value, and if it is determined that the NOx reduction amount does not become equal to or smaller than the threshold value (the condition is not met), the control process is returned to step S15, where the rich reduction is caused to continue, whereas if it is determined that the NOx reduction amount becomes equal to or smaller than the threshold value (the condition is met), the control process ends in step S17 to return to the initial step.

In this way, according to the present invention, when the exhaust gas temperature is low, the post-injection or the exhaust pipe injection is executed so that the DOC 25 adsorbs unburnt fuel, whereby the adsorbed unburnt fuel is dissociated into in the catalyst even when the ambient temperature is low. Then, in executing the rich reduction, the exhaust gas temperature is raised to be 200° C. or higher, whereby the adsorbed HC are desorbed so that NOx are reduced by the desorbed HC, thereby making it possible to prevent the slip of NOx in the rich reduction when the exhaust gas temperature is low.

The invention claimed is:

1. An NOx reduction control method for an exhaust gas aftertreatment device having an oxidation catalyst and an LNT catalyst which are disposed in an exhaust pipe and repeating an adsorption or occlusion of NOx which is executed when an air-fuel ratio is in a lean state and a reduction of NOx which is executed when the air-fuel ratio is in a rich state, the method comprising:

executing a post-injection of fuel or an exhaust pipe injection of fuel and causing HC to be adsorbed in the oxidation catalyst when an exhaust gas temperature is lower than a catalyst activation temperature; and after executing the port-injection of fuel or the exhaust pipe injection, causing the HC, which is adsorbed in advance by the oxidation catalyst, to be desorbed from the oxidation catalyst and reducing an adsorbed NOx in the LNT catalyst by raising the exhaust gas temperature when the exhaust gas temperature exceeds the catalyst activation temperature and it is instructed that the air-fuel ratio is caused to be in the rich state.

2. The NOx reduction control method for the exhaust gas aftertreatment device according to claim 1, wherein the post-injection or the exhaust pipe injection is executed when the exhaust gas temperature is 200° C. or lower, and wherein the HC which is adsorbed in the oxidation catalyst is caused to be desorbed and the NOx is reduced by raising the exhaust gas temperature either by executing the post-injection continuously after a main injection in which fuel is injected at a timing in proximity to a compression top dead center or by energizing a glow plug, when the exhaust gas temperature exceeds the catalyst activation temperature and the air-fuel ratio is caused to be in the rich state based on an NOx adsorption amount in the LNT catalyst.

3. The NOx reduction control method for the exhaust gas aftertreatment device according to claim 2, the method further comprising:

executing a normal reduction of NOx by supplying HC to the LNT catalyst either by causing the post-injection to be delayed or by executing the exhaust pipe injection, when an HC adsorption amount in the oxidation catalyst becomes equal to or smaller than a threshold value.

4. The NOx reduction control method for the exhaust gas aftertreatment device according to claim 3, the method further comprising:

causing the air-fuel ratio to be in the lean state and adsorbing or occluding NOx when an NOx reduction amount becomes equal to or smaller than a threshold value.

* * * * *